3,271,446
PREPARING ACETIC ACID BY THE CATALYTIC OXIDATION OF METHACROLEIN

Ralph O. Kerr, Houston, Tex., assignor to Petro-Tex Chemical Corporation, Houston, Tex., a corporation of Delaware
No Drawing. Filed July 2, 1962, Ser. No. 207,061
6 Claims. (Cl. 260—530)

This invention relates to a method for preparing acetic acid by catalytic oxidation of methacrolein.

It has been found that acetic acid is readily prepared from methacrolein by the reaction of methacrolein with oxygen in vapor phase over a modified vanadium catalyst in the presence of steam at a temperature below about 300° C. For example, when a mixture of methacrolein, steam, and air are passed over a catalyst containing vanadium and manganese or copper atoms, at a temperature of about 250° C., yields of acetic acid greater than 100 mol percent are obtained. Improved yields of acetic acid are obtained when such catalysts contain boron or antimony atoms.

While acetic acid is obtained from methacrolein by reaction with oxygen over a catalyst containing vanadium and manganese and/or copper atoms, in yields of greater than 100 mol percent per pass, it has been found further, quite unexpectedly, that yields of acetic acid from methacrolein of greater than 125 mol percent to as high as 150 mol percent and more are obtained when the catalyst contains, in addition to vanadium and manganese or copper atoms, boron or antimony atoms. The catalyst normally contains vanadium atoms with manganese or copper atoms; and preferably, also antimony or boron atoms, chemically combined in a complex on a carrier. Oxides of these atoms are normally present when the catalyst is used to oxidize methacrolein to acetic acid. When only vanadium and manganese or copper are present in the catalyst, the atomic ratio of vanadium will be from above 0.3 to 0.8 and manganese or copper will be from about 0.2 to 0.6. In the more useful and preferred three or more component catalysts, the atomic ratio of vanadium will be from about 0.3 to about 0.6, manganese and copper from about 0.05 to about 0.3, and antimony and boron from about 0.25 to about 0.65. The atomic ratio of vanadium normally will be above 0.3 to about 0.6, more preferably 0.35 to 0.55; the atomic ratio of manganese will be from about 0.05 to about 0.25, preferably from 0.1 to 0.2; the atomic ratio of antimony from about 0.3 to about 0.6, more preferably 0.4 to 0.5; the atomic ratio of boron from about 0.25 to about 0.65, more preferably from about 0.4 to 0.6; and the atomic ratio of copper from about 0.1 to about 0.3. Typical catalysts found useful in the process of this invention are those containing atoms in the form of the oxides of vanadium, manganese and antimony; vanadium, manganese and boron; and exceptionally good yields are obtained with a catalyst containing atoms of vanadium, copper and boron.

The feed to the acetic acid reactors normally will contain air in amount of about 20 to 70 volume percent, steam in amount from about 30 to about 80 volume percent, and 0.1 to 5 volume percent methacrolein. More normally about 0.25 to less than 2, as 1.5, volume percent methacrolein with 40 to 80 volume percent steam and 60 to 20 volume percent air will be fed to the reactor. The air should be present in amounts to provide a molar excess of oxygen and may be substituted by oxygen and the oxygen may be diluted with an inert gas such as nitrogen. When oxygen is substituted for air, the volume normally represented by nitrogen will be replaced with more steam. Steam is an essential component of the reactants in the reactor and there should be greater than about 20 volume percent steam present in the reactor. The temperature of the reaction is critical and the reaction will be conducted at a temperature in the range of above 200° C. to below 300° C., more preferably in the range of about 210° C., as 225° C., to about 275° C., as 260° C. The flow rate of the gaseous stream to the reactor may be varied but a preferably range of operation is at the rate of about 10 to 200 grams of methacrolein per liter of reactor space containing catalyst per hour, and more preferably in the range of about 15 to about 100. Residence time of the gaseous feed stream normally will be less than about 5 seconds and more preferably less than about 1 second to 0.1 second, down to a rate where less efficient operations are obtained. The pressure on the reactor may be above or below atmospheric. However, the pressure must be sufficiently high to overcome pressure drop through the reactor and insure a positive flow from the reactor. The effluent from the reactor is condensed and the steam condensate will contain the acetic acid with unreacted methacrolein going overhead. The high purity acetic acid is readily concentrated as by distillation.

The catalysts may be prepared by depositing solutions containing the prescribed atomic ratios of vanadium, manganese or copper, and boron or antimony onto a carrier. The solutions of catalyst-forming constituents may be prepared in a variety of ways. For example, vanadium pentoxide is dissolved in concentrated hydrochloric acid and the mixture refluxed. Manganese oxide is then dissolved in the resulting vanadyl chloride solution and boric acid or antimony trioxide is then dissolved in the solution. The solution also may be prepared by dissolving vanadyl chloride, manganese chloride and boric acid in water. The solution is concentrated if necessary and a carrier added to the solution, or the catalyst solution poured onto the carrier, and the catalyst deposited on the carrier from solution by heating and tumbling. After the catalyst complex has been coated onto the carrier and dried, the catalyst constituents are converted to the oxides by heating in the presence of an oxidizing gas such as air at a temperature greater than about 200° C.

Suitable vanadium compounds useful as starting materials for the catalyst are vanadium pentoxide, ammonium metavanadate, vanadium trioxide, vanadyl chloride, vanadyl dichloride, vanadyl sulfate, vanadium phosphate, vanadium tribromide, vanadyl formate, vanadyl oxalate, metavanadic acid, and the like. Manganese compounds include manganese acetate, manganese bromide, manganese carbonate, manganese chlorides, manganese hydroxide, manganese nitrate, manganese oxides, manganese orthophosphate, manganese sulfate and the like. Useful copper compounds include copper acetate, copper nitrate, copper oxides, copper oxychloride, copper sulfate and the like. Boron atoms may be introduced as boron tribromide, boron trichloride, boron oxide and the like. Antimony compounds used to form the catalyst complex include antimony tribromide, antimony pentachloride, antimony oxide, antimony oxychloride and the like.

If water soluble salts of the catalyst constituents are not employed, then oxides, hydroxides, carbonates and the like may be added to such acids as hydrochloric, hydriodic, hydrobromic, acetic, oxalic, formic and the like. Less desirably sulfuric acid is employed. In any event, the catalyst constituents are normally obtained in intimate admixture through use of a solution which may be heated to accelerate formation of the catalyst complex. As disclosed herein, the catalyst constituents are usually deposited from solution onto a carrier, although the necessary constituents may be formed together as in pellets and tablets and used in this form, but it is more economical, and better results normally are obtained, when the catalyst complex is deposited onto a carrier.

The carrier or support used normally has a low surface area, as usually measured, from about 0.001 to about 5 square meters per gram. A desirable form of carrier is one which has a dense non-absorbing center and a rough enough surface to aid in retaining the catalyst adhered thereto during handling and under reaction conditions. The carrier may vary in size but generally is from about 2½ mesh to about 10 mesh in the Tyler standard screen size. Carrier particles as large as ¼ inch times ¼ inch cylinders or larger are satisfactory. Carriers much smaller than 10 to 12 mesh normally cause an undesirable pressure drop in the reactor, unless the catalysts are being used in a fluid bed apparatus. Very useful carriers are Alundum, silicon carbide, Carborundum, pumice, kieselguhr, asbestos and the like. Any of the Alundums or other inert alumina carriers may be used. Likewise, a variety of silicon carbides may be employed. Silica gel may be used. The amount of catalyst complex on the carrier is usually in the range of greater than about 5 to about 30 weight percent of the total weight of complex plus carrier and preferably about 10 to 20 weight percent on an inert carrier such as Alundum. The amount of the catalyst complex deposited on the carrier should be enough to substantially coat the surface of the carrier and this normally is obtained with the ranges set forth above. With more absorbent carriers, larger amounts of material may be required to obtain essentially complete coverage of the carrier. In the case of silicon carbide, about 25 percent of catalyst is normally used. In a fixed bed process the final particle size of the catalyst particles which are coated on a carrier preferably will be about 2½ to about 10 mesh size in the Tyler standard screen size. The carriers may be of a variety of shapes, the preferred shape of the carriers is in the shape of cylinders or spheres. Although more economical use of the catalyst on a carrier in fixed beds is obtained, as has been mentioned, the catalyst may be employed in fluid bed systems. Of course, the particle size of the catalyst used in fluidized beds is quite small, usually varying from about 10 to about 150 microns.

Inert diluents such as silica may be present in the catalyst, but the combined weight of the essential ingredients as the oxides should preferably consist essentially of at least about 50 weight percent of the composition which is coated on the carrier, and preferably these components are at least about 75 weight percent of the composition coated on the carrier, and more preferably at least about 95 weight percent. If desired, any remainder other than the atoms of vanadium, manganese or copper, antimony or boron, and oxygen, may be any essentially inert non-catalytic ingredient intimately combined with the active catalyst as a part of the coating on the carrier; or other modifying or stabilizing agents may be used.

The methacrolein for conversion to acetic acid may be obtained in a variety of ways. A particularly economical source of methacrolein is by the catalytic oxidation of isobutylene in accordance with U.S. Patents 3,029,288, 3,031,508 and 3,038,942, wherein isobutylene is oxidized in vapor phase over a vanadium oxyphosphate catalyst complex to provide methacrolein in a gas stream, which reaction may be combined with the process of the present invention for a continuous process for preparing acetic acid directly from isobutylene in an economic process. Feed streams from the methacrolein reactor may be suitably adjusted to a concentration of methacrolein of from 0.25 to 2 mol percent methacrolein, about 40 to 70 volume percent steam, and about 50 to 30 volume percent air, or the equivalent amount of oxygen, which are then passed into the acetic acid reactor in accordance with this invention.

A variety of reactors will be found to be useful and multiple tube heat exchanger type reactors are quite satisfactory. The tubes of such reactors may vary in diameter from about ¼ inch to about 3 inches, and the length may be varied from about 3 to about 10 or more feet. Relatively close control of the reaction temperature should be maintained. It is desirable to have the surface of the reactors at a relatively constant temperature and some medium to conduct heat from the reactors will aid in temperature control. Such media may be Wood's metal, molten sulfur, mercury, molten lead, and the like, but it has been found that eutectic salt baths are completely satisfactory. One such salt bath is a sodium nitrate-sodium nitrite-potassium nitrate eutectic constant temperature mixture. An additional method of temperature control is to use a metal block reactor whereby the metal surrounding the tube acts as a temperature regulating body. As will be recognized by the man skilled in the art, the heat exchange medium may be kept at the proper temperature by heat exchangers and the like. The reactor or reaction tubes may be iron, stainless steel, carbon-steel, nickel, glass tubes such as Vycor and the like. Both carbon-steel and nickel tubes have excellent long life under the conditions of the reactions described herein. Normally, the reactors contain a preheat zone of an inert material such as ¼ inch Alundum pellets, inert ceramic balls, nickel balls or chips and the like, present at about one-half to one-fourth the volume of the active catalyst present.

*Example 1*

A catalyst was prepared containing a complex mixture of vanadium oxide, manganese oxide, and antimony oxide. The atomic ratio of vanadium manganese and antimony was 0.4 vanadium, 0.15 manganese, and 0.45 antimony. This catalyst was prepared by dissolving 50.3 grams of vanadium pentoxide in 1000 ml. of concentrated hydrochloric acid containing 37 percent by weight HCl. The mixture was refluxed and after a clear blue solution was obtained indicating vanadium ions having a valence of less than 5 being present, there was added 13.1 grams of manganese dioxide and the mixture was again refluxed until a clear solution was obtained. Thereafter 80.6 grams of antimony trioxide was added to the solution which was refluxed again until a clear solution was obtained. This solution was then evaporated to 200 ml. The concentrated solution was then poured over 756 grams of ³⁄₁₆" x ³⁄₁₆" cylindrical inert alumina pellets and the catalyst deposited by heating and tumbling during evaporation of the water and the pellets thereafter dried at a temperature of about 120° C. The catalyst pellets were coated with about 16 percent of the catalyst complex. 200 ml. of catalyst particles were loaded into a 36 inch long ¾ inch i.d. nickel tube, which was heated by means of a salt bath. 50 ml. of ⅛" Alundum pellets were placed on top of the catalyst to function as a preheat zone. A feed stream, containing 59 volume percent steam, 0.27 volume percent methacrolein based on the volume of air, and 40.73 volume percent air was passed through the reactor at a rate of 25 grams of methacrolein per liter of catalyst per hour at a temperature of 230° C. to 235° C. for about 48 hours. The effluent from the reactor was analyzed and found to contain 138 mol percent acetic acid per pass. This value is based on one mol of methacrolein forming one mol of acetic acid. When the above example was repeated at 230° C. without steam, only 40 mol percent acetic acid was obtained. When the example was repeated with steam at about 315° C., only about 70 mol percent acetic acid was obtained.

*Example 2*

Another catalyst was prepared from vanadium oxide, manganese oxide, and boron oxide. The atomic ratio of vanadium, manganese and boron in the catalyst was 0.35 vanadium, 0.15 manganese and 0.5 boron. This catalyst was prepared by dissolving 61.2 grams of vanadium pentoxide in 1000 ml. of concentrated hydrochloric acid containing 37 percent by weight HCl. The mixture was refluxed and after a clear blue solution was obtained indicating vanadium ions having a valence of less than 5 being present, there was added 25.1 grams of manganese dioxide and the mixture was again refluxed until a clear solution was obtained. Thereafter 59.6 grams of boric acid was added to the solution which was refluxed again until a clear solution was obtained. This solution was then evaporated to 200 ml. The concentrated solution was then mixed with 480 grams of 1/8" x 1/8" cylindrical inert alumina pellets and the catalyst deposited thereon by heating and tumbling during evaporation of the water and the pellets thereafter dried at a temperature of about 120° C. The catalyst pellets were coated with 20 percent of the catalyst complex. 200 ml. of catalyst particles were loaded into a 36 inch long 3/4 inch I.D. nickel tube which was heated by a salt bath. 50 ml. of 1/8 inch Alundum pellets were placed on top of the catalyst to function as a preheat zone. A feed stream containing 61 volume percent steam, 0.22 volume percent, based on the volume of air, of methacrolein, and 38.78 volume percent air was passed through the reactor at a rate of 31 grams of methacrolein per liter of catalyst per hour at a temperature of 235° C. The yield of acetic acid was 151 mol percent acetic acid per pass. The acetic acid is collected by condensation and the condensate distilled to isolate the high purity acetic acid.

Example 3

A catalyst complex of vanadium oxide and manganese oxide containing vanadium and manganese in an atomic ratio of 0.7 vanadium and 0.3 manganese was prepared by dissolving 63.8 grams of vanadium pentoxide in 1000 ml. of concentrated hydrochloric acid containing 37 percent by weight HCl. The mixture was refluxed and after a clear blue solution was obtained, there was added 26.2 grams of manganese dioxide and the mixture was again refluxed until a clear solution was obtained. This solution was then evaporated to 200 ml. and the catalyst was deposited onto 510 grams of 1/8" x 1/8" cylindrical inert alumina pellets by heating and tumbling and the pellets were dried at 120° C. The carrier pellets were coated with about 15 percent of the catalyst complex. 200 ml. of catalyst particles were loaded into the 36 inch nickel tube reactor with 50 ml. of 1/8 inch Alundum pellets placed on top of the catalyst to function as a preheat zone. A feed stream containing 36 volume percent steam, 0.12 volume percent methacrolein, based on air, and 63 volume percent air was passed through the reactor at a rate of 11 grams of methacrolein per liter of catalyst per hour at a temperature of 255° C. The effluent from the reactor was analyzed and found to contain 126 mol percent acetic acid.

Example 4

The catalyst of this example was prepared from vanadium oxide, manganese oxide, and copper oxide by dissolving 51.2 grams of vanadium pentoxide in 1000 ml. of concentrated hydrochloric acid containing 37 percent by weight HCl. The mixture was refluxed and after a clear blue solution was obtained, there was added 22.4 grams of manganese dioxide and the mixture was again refluxed until a clear solution was obtained. Thereafter 16.4 grams of copper oxide was added to the solution which was refluxed again until a clear solution was obtained. This solution was then evaporated to 200 ml. and the catalyst deposited on 510 grams of 1/8" x 1/8" alumina pellets as in the previous examples. The atomic ratio of vanadium, manganese and copper in the catalyst was 0.55 vanadium, 0.25 manganese, and 0.20 copper. The catalyst pellets were coated with 15 percent of the catalyst complex. 200 ml. of catalyst pellets were loaded into a 36 inch long 3/4 inch I.D. nickel tube which was heated by a salt bath. 50 ml. of 1/8" Alundum pellets were placed on top of the catalyst to function as a preheat zone. A feed stream containing 60 volume percent steam, 0.28 volume percent methacrolein, based on the air, and 27 volume percent air was passed through the reactor at a rate of 26 grams of methacrolein per liter of catalyst per hour at a temperature of 235° C. The effluent from the reactor was analyzed and found to contain 112 mol percent of acetic acid.

Example 5

The catalyst of this example was a complex of vanadium oxide, copper oxide, and boron oxide, prepared by dissolving 64.5 grams of vanadium pentoxide in 1000 ml. of concentrated hydrochloric acid containing 37 percent by weight HCl. The mixture was refluxed and after a clear blue solution was obtained there was added 22.6 grams of cupric oxide and the mixture was again refluxed until a clear solution was obtained. Thereafter 26.3 grams of boric acid was added to the solution which was refluxed again until a clear solution was obtained. This solution was then evaporated to 200 ml. and the catalyst was deposited on 510 grams of 1/8" x 1/8" cylindrical inert alumina pellets as described in the previous axamples, and the pellets were dried at a temperature of about 120° C. The atomic ratio of vanadium, copper and boron was 0.5 vanadium, 0.2 copper, and 0.3 boron. The catalyst pellets were coated with 15 percent of the catalyst complex. 200 ml. of catalyst particles were loaded into a 36 inch long 3/4 inch I.D. nickel tube which was heated by a salt bath. 50 ml. of 1/8" Alundum pellets were placed on top of the catalyst to function as preheat zone. A feed stream containing 72 volume percent steam, 0.59 volume percent methacrolein, based on the air, and 27 volume percent air was passed through the reactor at a rate of 56 grams of methacrolein per liter of catalyst per hour at a temperature of 240° C. 153 mol percent per pass of acetic acid was obtained which was collected by condensation and the condensate distilled to isolate the high purity acetic acid.

I claim:

1. A process for preparing acetic acid which comprises contacting at a temperature in the range of above 200° C. to below 300° C. at a residence time of less than 5 seconds, a gaseous mixture of methacrolein, a molar excess of oxygen and at least a 20 volume percent of steam with a catalyst comprising a complex of vanadium atoms and atoms selected from the group consisting of manganese and copper in an atomic ratio of about 0.3 to 0.8 atom of vanadium and about 0.2 to 0.6 atom selected from the group consisting of manganese and copper, wherein said complex constitutes at least about 50 weight percent of the catalyst.

2. A process for preparing acetic acid which comprises contacting at a temperature in the range of above 200° C. and less than 300° C. at a residence time of less than 5 seconds a gaseous mixture of methacrolein and a molar excess of oxygen and at least a 20 volume percent of steam with a catalyst comprising a complex of (1) vanadium atoms, (2) atoms selected from the group consisting of manganese and copper, and (3) atoms selected from the group consisting of antimony and boron, in an atomic ratio of (1) about 0.3 to 0.6 of vanadium, (2) about 0.05 to 0.3 of atoms selected from the group consisting of manganese and copper, and (3) about 0.25 to 0.65 of atoms selected from the group consisting of antimony and boron wherein (1), (2) and (3) above constitute at least about 50 weight percent of the catalyst.

3. A process for preparing acetic acid which comprises oxidizing a mixture of 0.25 to 2 volume percent of methacrolein with about 20 to 70 volume percent air and about 30 to 80 volume percent of steam at a temperature between 210° C. and 275° C. and at a residence time of less than 5 seconds with a catalyst comprising a complex of atoms of vanadium, manganese and antimony in an atomic ratio of 0.35 to 0.55 vanadium, 0.1 to 0.2 manganese and 0.4 to 0.5 antimony wherein said complex constitutes at least about 50 weight percent of the catalyst.

4. A process for preparing acetic acid which comprises oxidizing a mixture of 0.25 to 2 volume percent of methacrolein with about 20 to 70 volume percent air and about 30 to 80 volume percent steam at a temperature between 210° C. and 275° C. and at a residence time of less than 5 seconds with a catalyst comprising a complex of atoms of vanadium, manganese and boron in an atomic ratio of 0.35 to 0.55 vanadium, 0.1 to 0.2 manganese, and 0.4 to 0.6 boron wherein said complex constitutes at least about 50 weight percent of the catalyst.

5. A process for preparing acetic acid which comprises oxidizing a mixture of 0.25 to 2 volume percent of methacrolein with about 20 to 70 volume percent of air and about 30 to 80 volume percent of steam at a temperature between 210° C. and 275° C. with a catalyst comprising a complex of atoms of vanadium, copper and boron in an atomic ratio of 0.35 to 0.55 vanadium, 0.1 to 0.3 copper, and 0.4 to 0.6 boron wherein said complex constitutes at least about 50 weight percent of the catalyst.

6. A process for preparing acetic acid which comprises oxidizing a mixture of 0.25 to 2 volume percent of methacrolein with about 20 to 70 volume percent of air and about 30 to 80 volume percent of steam at a temperature between 210° C. and 275° C. and at a retention time of less than 5 seconds with a catalyst comprising an inert carrier having deposited thereon atoms of vanadium, copper and boron in an atomic ratio of 0.35 to 0.55 vanadium, 0.1 to 0.3 copper and 0.4 to 0.6 boron, said atoms being deposited on said carrier in a concentration of greater than 5 weight percent of the total weight of the catalyst.

References Cited by the Examiner

UNITED STATES PATENTS

| | | | |
|---|---|---|---|
| 1,951,789 | 3/1934 | Mueller-Cunradi et al. | 260—530 |
| 2,881,212 | 4/1959 | Idol et al. | 260—530 |
| 2,881,214 | 4/1959 | Idol et al. | 260—530 |
| 2,938,001 | 5/1960 | De Rosset | 252—432 |
| 3,030,314 | 4/1962 | Knowlton et al. | 252—432 |
| 3,087,964 | 4/1963 | Koch et al. | 260—530 |

FOREIGN PATENTS 482,736  1938  Great Britain.

LORRAINE A. WEINBERGER, *Primary Examiner.*

CHARLES B. PARKER, LEON ZITVER, *Examiners.*

G. P. D'ANGELO, I. R. PELLMAN,
*Assistant Examiners.*